(12) United States Patent
Nonaka et al.

(10) Patent No.: US 6,804,088 B1
(45) Date of Patent: Oct. 12, 2004

(54) THIN FILM MAGNETIC HEAD, MANUFACTURING METHOD THEREOF AND MAGNETIC STORAGE

(75) Inventors: Yoshihiro Nonaka, Tokyo (JP); Haruo Urai, Tokyo (JP); Nobuyuki Ishiwata, Tokyo (JP); Kiyotaka Shimabayashi, Tokyo (JP); Tetsuhiro Suzuki, Tokyo (JP); Shinsaku Saitho, Tokyo (JP); Hiroaki Tachibana, Tokyo (JP); Tamaki Toba, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/743,521

(22) PCT Filed: Jul. 5, 1999

(86) PCT No.: PCT/JP99/03626

§ 371 (c)(1),
(2), (4) Date: Jan. 11, 2001

(87) PCT Pub. No.: WO00/04535

PCT Pub. Date: Jan. 27, 2000

(30) Foreign Application Priority Data

Jul. 15, 1998 (JP) .......................................... 10-200597

(51) Int. Cl.⁷ .............................................. G11B 5/147
(52) U.S. Cl. ..................................................... 360/317
(58) Field of Search ................................ 360/317, 126, 360/125, 319

(56) References Cited

U.S. PATENT DOCUMENTS

| | | | | |
|---|---|---|---|---|
| 4,589,042 A | * | 5/1986 | Anderson et al. | 360/125 |
| 5,245,493 A | * | 9/1993 | Kawabe et al. | 360/126 |
| 5,600,519 A | * | 2/1997 | Heim et al. | 360/126 |
| 5,774,308 A | * | 6/1998 | Ohtsuka et al. | 360/317 |
| 5,793,578 A | * | 8/1998 | Heim et al. | 360/126 |
| 5,801,910 A | * | 9/1998 | Mallary | 360/126 |
| 5,805,391 A | * | 9/1998 | Chang et al. | 360/317 |
| 6,069,775 A | * | 5/2000 | Chang et al. | 360/126 |
| 6,104,576 A | * | 8/2000 | Santini | 360/126 |
| 6,111,724 A | * | 8/2000 | Santini | 360/126 |
| 6,122,144 A | * | 9/2000 | Chang et al. | 360/122 |
| 6,134,080 A | * | 10/2000 | Chang et al. | 360/126 |
| 6,282,776 B1 | * | 9/2001 | Otsuka et al. | 360/126 |

FOREIGN PATENT DOCUMENTS

| | | |
|---|---|---|
| JP | 56-11615 | 2/1981 |
| JP | 60-10409 | 1/1985 |
| JP | 61-178710 | 8/1986 |
| JP | 63-58610 | 3/1988 |
| JP | 63-298808 | 12/1988 |
| JP | 2-15407 | 1/1990 |
| JP | 2-54412 | 2/1990 |
| JP | 2-64908 | 3/1990 |
| JP | 2-302916 | 12/1990 |
| JP | 3-29104 | 2/1991 |
| JP | 3-91109 | 4/1991 |
| JP | 5-89430 | 4/1993 |
| JP | 5-143939 | 6/1993 |
| JP | 6-124415 | 5/1994 |

(List continued on next page.)

*Primary Examiner*—George J. Letscher
*Assistant Examiner*—Christopher R. Beacham
(74) *Attorney, Agent, or Firm*—McGinn & Gibb, PLLC

(57) ABSTRACT

A thin film magnetic head includes a recording pole layer that is divided into a tip portion, a wide rear portion, a flare portion, and a yoke portion as viewed from the air bearing surface (ABS). The tip portion and the wide rear portion directly contact a write gap layer. Part of the wide rear portion has a greater width that the tip portion. The wide rear portion is provided between the tip portion and the flare portion to reduce magnetic reluctance. Accordingly, it is possible to improve the pattern accuracy of the tip portion width by providing the flare portion, which reflects a large quantity of light, far from the ABS, while preventing an increase of the magnetic reluctance.

26 Claims, 18 Drawing Sheets

FOREIGN PATENT DOCUMENTS

| | | | | | |
|---|---|---|---|---|---|
| JP | 6-274836 | 9/1994 | JP | 9-270105 | 10/1997 |
| JP | 7-311911 | 11/1995 | JP | 10-112006 | 4/1998 |
| JP | 8-87717 | 4/1996 | JP | 11-167705 | 6/1999 |
| JP | 8-249614 | 9/1996 | JP | 2000-20915 | 1/2000 |

* cited by examiner

THIN FILM MAGNETIC HEAD, MANUFACTURING METHOD THEREOF AND MAGNETIC STORAGE

BACKGROUND OF THE INVENTION

1. Field of the Invention

The present invention relates to a thin film magnetic head of inductive type, a production method thereof, and magnetic recording apparatus.

2. Description of the Related Art

Recently, the recording density of a hard disc apparatus has been remarkably increased. Since the 1990 year, the recording density has been increased by about 60% every year. In order to increase the recording density of a hard disc apparatus, it is necessary to reduce the magnetic head track width so as to increase the recording track density. Furthermore, in order to increase the recording density, it is also important to increase the recording bit density. For increasing the recording bit density, it is necessary to increase the recording medium having a high coercive force Hc requires an inductive magnetic recording head having a high recording efficiency. Moreover, in order to effectively detect a signal from a small recording bit, it is necessary to use an MR reproduction head. Accordingly, there is a great expectation on a high density recording realized by using an MR head in combination with an inductive recording head, i.e., a thin film magnetic head of the MR-inductive composite type.

FIG. 15 and FIG. 16 show a conventional thin film magnetic head of the MR-inductive composite type. FIG. 16 is plan view of the entire configuration and FIG. 15 is a cross sectional view about the XV—XV line in FIG. 16.

The conventional thin film magnetic head 70 includes a lower shield layer 74, a read gap layer 80, a lower pole layer 82 serving also as an upper shield layer; and a write gap layer 84 formed in this order on an insulation substrate (not depicted). The thin film magnetic head 70 also includes a magneto-sensitive element inserted into the read gap layer and facing the ABS (air bearing surface) 76. The thin film magnetic head 70 further includes: the a first filling material layer 86 formed on the write gap layer 84 excluding the vicinity of the ABS 76; a coil pattern layer 88; and a second filling material layer 90 formed in this order. The thin film magnetic head 70 further includes a recording pole layer 92 formed on the write gap layer 84 and the first filling material layer 86 as well as on the second filling material layer 90.

The lower pole layer 82 serves as a lower pole layer of the inductive recording head as well as an upper shield layer for increasing the reproduction resolution. The MR magneto-sensitive element 78 detects a signal magnetic field from a magnetic storage medium (not depicted) facing the ABS 76. The write gap layer 84 has a thickness as a gap of the inductive recording head. The first filling material layer 86 serves as an insulation fundament of the coil pattern layer 86. The second filling material layer 90 dissolves the convex and concave configuration of the coil pattern layer 88.

Explanation will now be given on the recording operation of the thin film magnetic head 70. A magnetic flux generated when electric current is applied to the coil pattern layer 88 flows from a pole window 94 at the center of the coil pattern layer 88 through the recording pole 92 having a small magnetic reluctance (by 10 to 100 times compared to the air) to return to the pole window 94. On the other hand, the recording pole and the lower pole layer 82 are connected to each other via a space provided by the write gap layer. Accordingly, a portion of the magnetic field in the write gap layer 84 leaks to the ABS 76, generating a recording magnetic field.

FIG. 17 and FIG. 18 shows a part of the thin film magnetic head 70 enlarged partially. FIG. 18 is a partial plan view, and FIG. 17 is a cross sectional view about the line XVII—XVII in FIG. 18 Explanation will now given, referring to these figures.

Firstly, in this Specification the terms "width" and "length" are defined as follows. The width is in a direction vertical to the thickness direction of the write gap layer 84 and parallel to the ABS 76. The length is in a direction vertical to the ABS 76.

The recording pole 92 can be divided into a tip portion 921, a flare portion 92, and a yoke portion 923 in this order from the side of the ABS 76. The flare portion 922 reduces its width continuously from the yoke portion 923 toward the tip portion 921. The tip portion 921 extends with a constant width W from the ABS 76 to reach the flare portion 922.

Referring to FIG. 17 and 18, it is assumed that the tip portion 921 has tip length L. The tip length L is determined by a mask pattern used when performing frame plating of the recording pole layer 92. Moreover, a gap depth D is assumed to be a distance between the ABS 76 and the tip of the first of the first filling material layer. That is, the depth D is a portion of the write gap layer sandwiched only by the recording pole layer and the lower pole layer. The recording track width is determined by the tip width W of the recording pole layer 92 and is almost equal to the tip width W. In order to obtain a high recording density, it is necessary to realize the recording pole layer 92 having a tip width W as small as possible.

As shown in FIG. 18, the relationship between the tip length L and the gap depth D is conventionally L>D. Accordingly, the tip portion 921 is partially located on a stepped portion of the first filling material layer 86. On the other hand, the photo-resist pattern used for forming the tip portion 921 deteriorates the dimension accuracy because the light is reflected by the stepped portion during exposure. Accordingly, in order to form the tip width W at the ABS 76 with a high dimensional accuracy, the flare portion 922 reflecting a large amount of light should be located at a large distance from the ABS 76.

The magnetic flux which has passed through the yoke portion 923 is converged at the flare portion 922 and further converted at the narrow tip portion 921. When the tip length L is large, a considerable leak is caused at a narrow portion of a high magnetic reluctance such as the tip portion 921. This decreases the magnetic flux supply to the tip portion 921. This, in turn, decreases the magnetic field at the write gap layer 84 at the ABS 76. Accordingly, in order to reduce the magnetic reluctance at the tip portion 921 so as to obtain a sufficient recording magnetic field, it is necessary to make the tip length L as much as possible.

However, if the tip length L is decreased, the flare portion 922 is formed at a position nearer to the ABS 76. Accordingly, if the tip length L is reduced, as has been described above, the light reflection from the stepped portion deteriorates the pattern formation accuracy at the tip portion 921.

Thus, the accurate formation of the tip reduction of the magnetic reluctance of the tip portion 921 so as to obtain a sufficient recording magnetic field.

SUMMARY OF THE INVENTION

It is therefore an object of the present invention to provide a thin film magnetic head, a production method thereof, and a magnetic recording apparatus, wherein the tip width can be formed with a high accuracy without increasing the magnetic reluctance at the tip portion. The present invention provides a thin film magnetic head comprising a write gap layer formed on a lower pole layer; a first filling material layer, a coil pattern layer, a second filling material layer which are successively formed in this order on the write gap layer excluding the vicinity of the ABS; and a recording pole layer formed on the write gap layer at least in the vicinity of the ABS. The recording pole layer is divided into a tip portion, a wide rear portion, a flare portion, and a yoke portion in this order viewed from the ABS. The tip portion and the wide rear portion are provided on the write gap layer. The wide rear portion has a greater width than the tip portion when the width is determined as vertical to the film thickness direction of the write gap layer and parallel to the ABS.

The present invention is characterized by the wide rear portion provided between the tip portion and the flare portion. The wide rear portion is provided together with the tip portion on the flat write gap layer. Accordingly, no light is reflected by the wide rear portion to the tip portion during exposure. Moreover, the wide rear portion has a greater width than the tip portion, which mitigates increase of the magnetic reluctance. Accordingly, it is possible to provide the flare portion reflecting a large quantity of light, far from the ABS so as to improve the pattern accuracy, while suppressing increase of the magnetic reluctance.

In the thin film magnetic head claimed in claims 3 to 10, some of the components of the thin film magnetic head of claim 1 are defined precisely.

DESCRIPTION OF THE PREFERRED EMBODIMENTS

Hereinafter, preferred embodiments of the present invention will be detailed, referring the attached drawings. Like reference symbols are used for like components, and their explanation will be given only, once.

Figure 1:
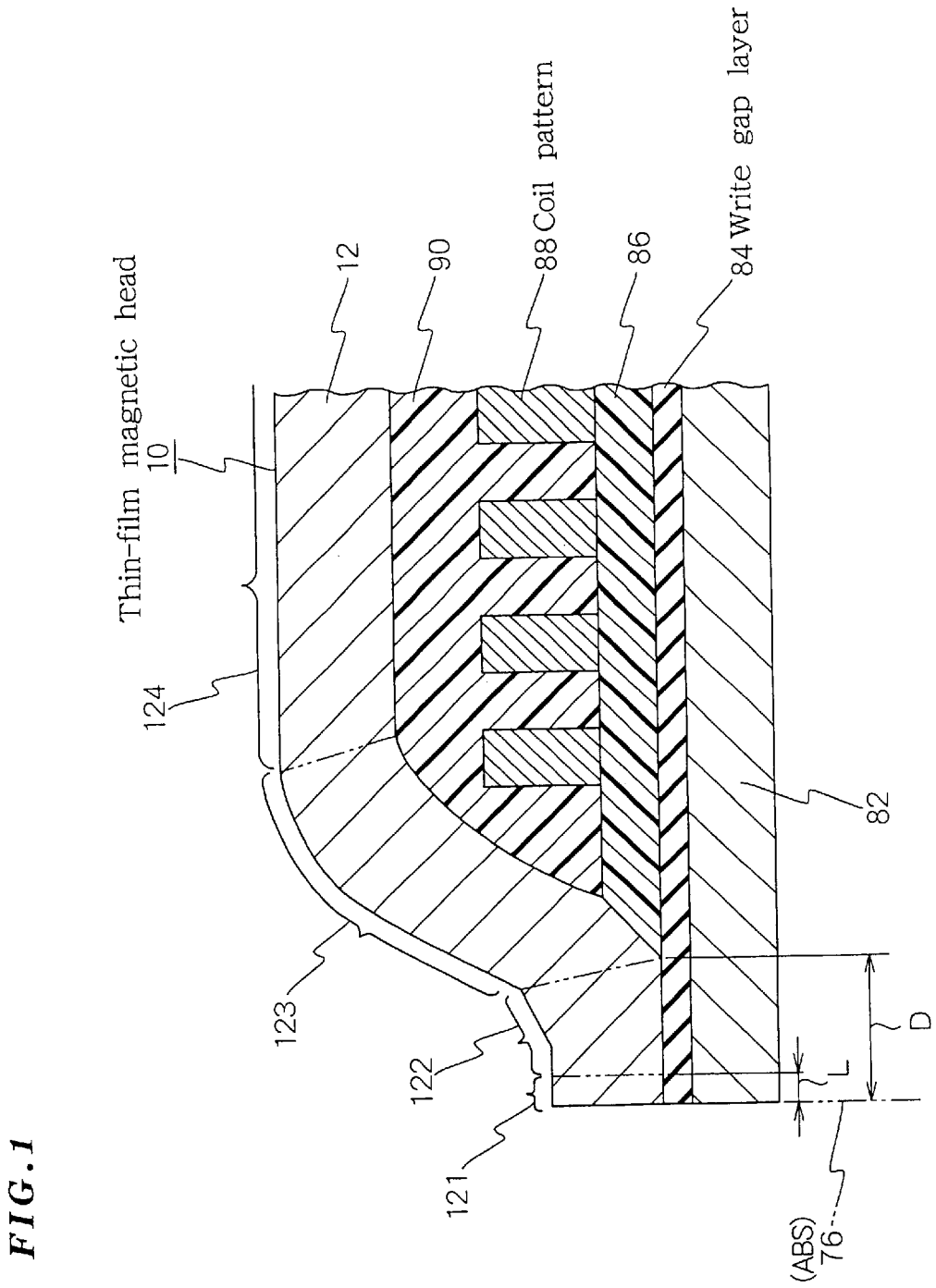
FIG. 1 is a cross sectional view of a thin film magnetic head according to a first embodiment of the present invention, viewed about the line I—I in FIG. 2.
Figure 2:
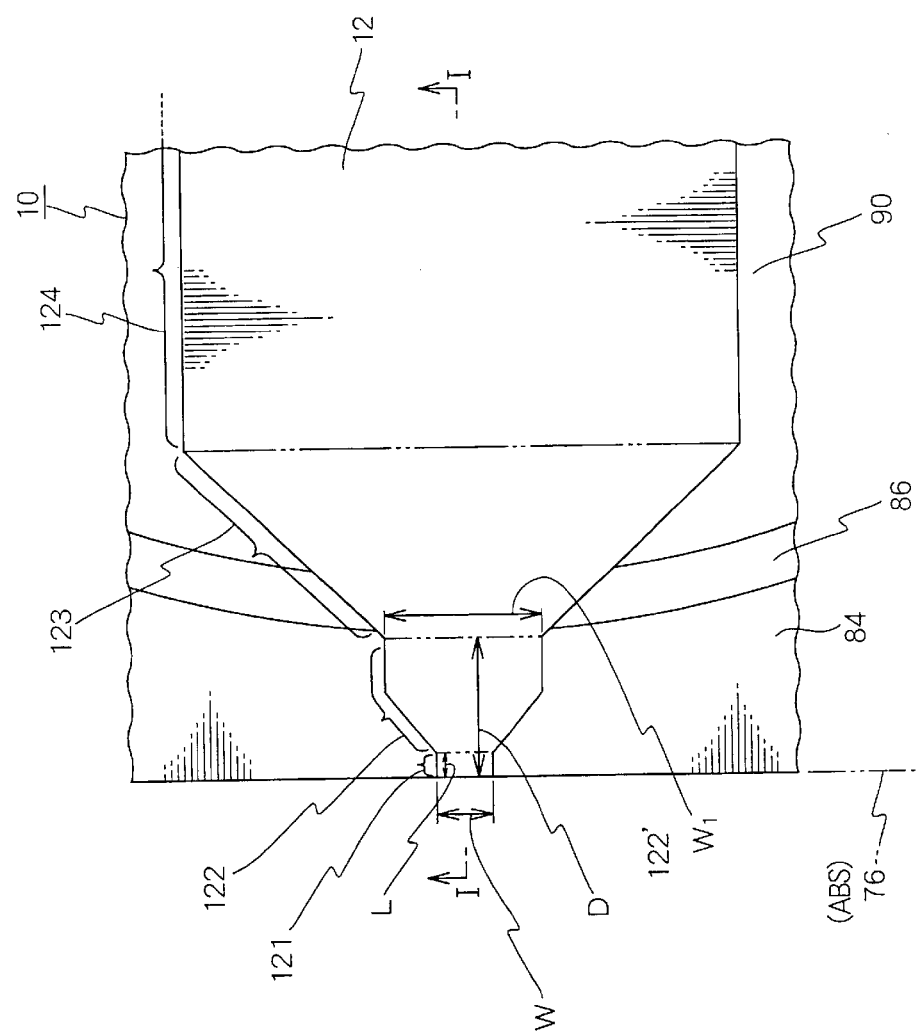
FIG. 2 is a plan view of the thin film magnetic head of FIG. 1.

FIG. 1 is a cross sectional view of a thin film magnetic head according to a first embodiment of the present invention, viewed about the line I—I in FIG. 2. FIG. 2 is a plan view of the thin film magnetic head of FIG. 1. Hereinafter, explanation will be given, referring to these figures.

The thin film magnetic head 10 according to the present invention includes a lower pole layer 82 on which a write gap layer 84 is provided. On the write gap layer 84 excluding the vicinity of the ABS76, there are provided a first filling material layer 86, a coil pattern layer 88, and a second filling material layer 90 which are layered in this order. Moreover, a recording pole layer 12 is layered on a portion of the write gap layer 84 in the vicinity of the ABS 76, the first filling material layer 86, and the second filling material layer 90.

The recording pole layer 12 is divided into four portions: a tip portion 121, a wide rear portion 122, a flare portion 123, and a yoke portion 124 in this order from the side of the ABS 76. If a width is defined as in a vertical direction to the film thickness direction and in a parallel direction to the ABS 76, the wide rear portion 122 has a width greater than the tip portion 121.

The flare portion 123 becomes narrower toward the wide rear portion 122 and is in contact with the wide rear portion 122 with a predetermined width (rear wide portion $W_1$ which will be detailed later). The wide rear portion extends to a point at a predetermined distance with a constant width toward the tip portion 121, and then gradually decreases its width toward the tip portion 121.

Description will now be directed to a production method of the thin film magnetic head 10.

Firstly, on an insulator substrate (not depicted), the lower pole layer is formed by frame plating of a NiFe film having a thickness of 3 micrometers.

1) Subsequently, the write gap layer 84 is formed by sputtering so as to obtain an Al2O3 film having a thickness of 350 nm.

2) Subsequently, the first filling material layer 86 is formed by using a photo-resist pattern and thermally hardening so as to obtain insulation between the lower pole layer 82 and a coil pattern layer 88.

Subsequently, the coil pattern layer 88 is formed by plating as a Cu film having a thickness of 3 micrometers.

Subsequently the second filling material layer 90 is formed using a photo-resist pattern and thermal hardening so as to obtain insulation between the lower pole layer 82 and the coil pattern layer 88.

Subsequently, a resist frame pattern is formed by exposure to obtain the recording pole layer 12. The mast used here has such a configuration that the bottom surface of the tip portion 121 and the wide rear portion 122 are entirely in contact with the write gap layer 84; and the wide rear portion 122 has toward the side of the flare portion 123 up to 4 times greater than the width W.

Subsequently, the recording pole layer 12 is formed by frame plating of NiFe film having a thickness of 4 micrometers. It should be noted that recording pole layer 12 is connected to the lower pole layer 82 through pole window 94 (FIG. 14 and FIG. 15) at the center of the coil pattern layer 88.

Figure 3:
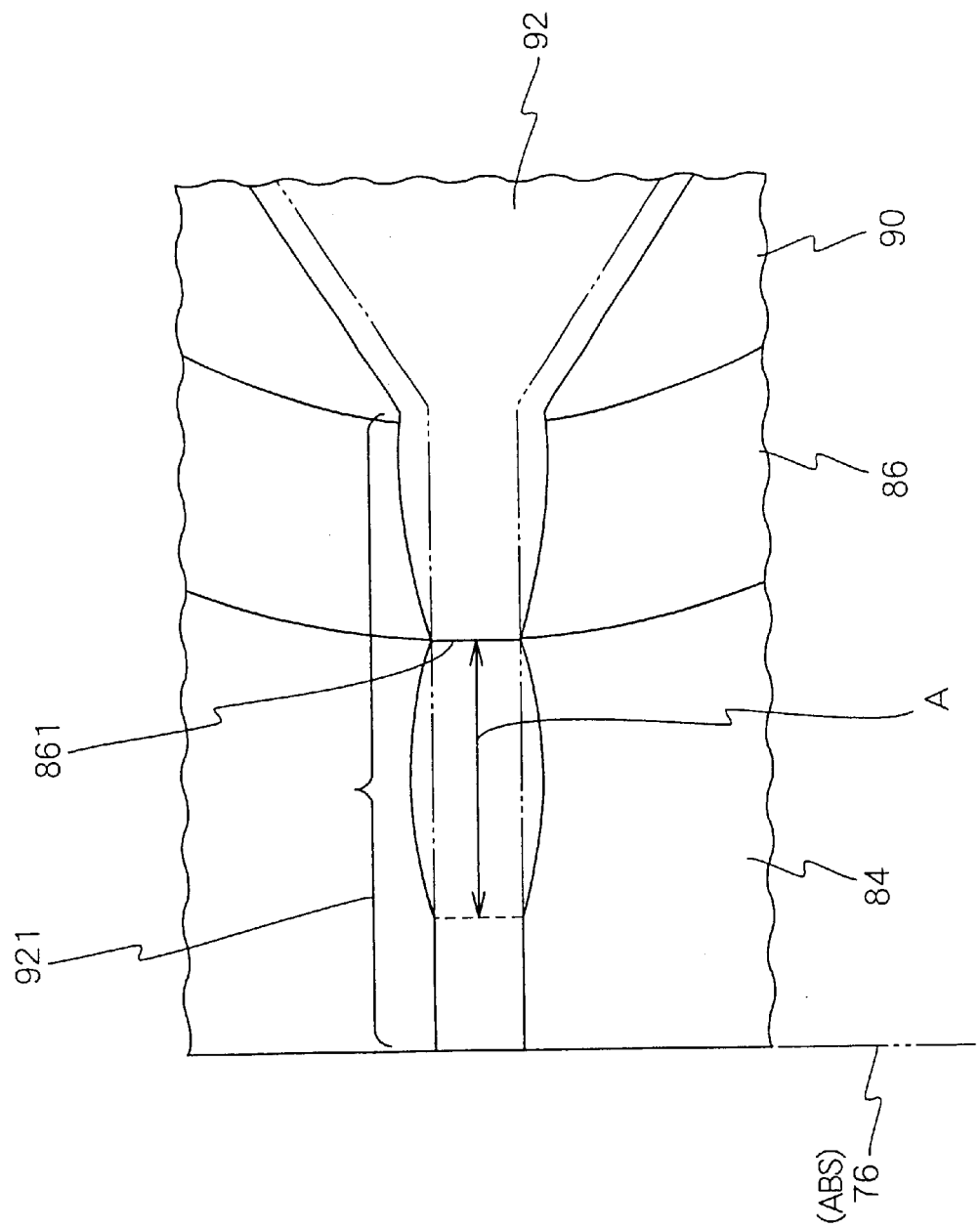
FIG. 3 is an enlarged plan view of the tip portion of a conventional thin film magnetic head shown in FIG. 18.
Figure 4:
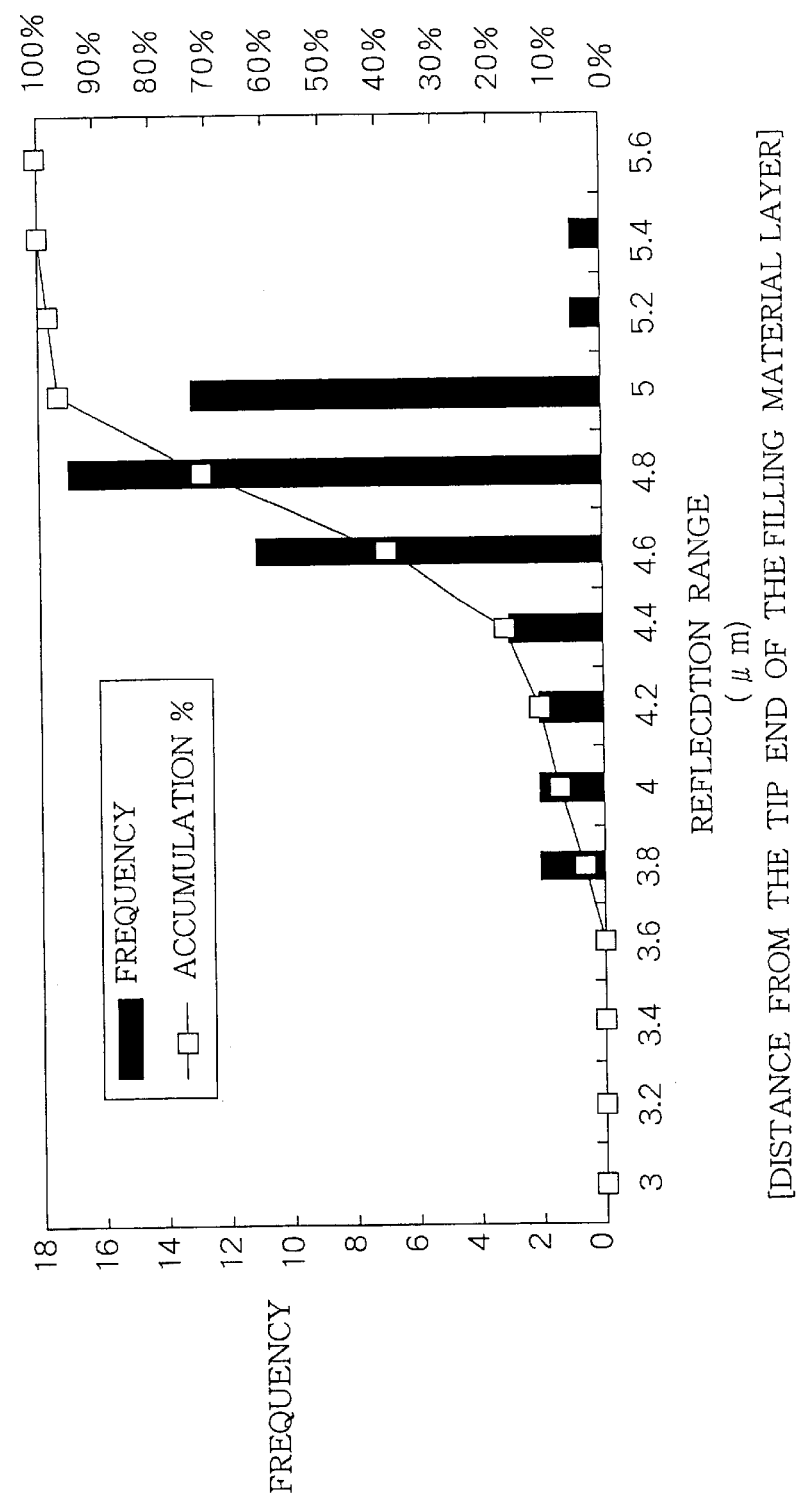
FIG. 4 is a graph showing the effect of light reflection from a stepped portion on the write gap layer of the thin film magnetic head of FIG. 3.

FIG. 3 is an enlarged partial plan view of a conventional thin film magnetic head. FIG. 4 is a graph showing an effect of reflection from stepped portion of on a write gap layer of a conventional thing film magnetic head. Hereinafter, explanation will be given, referring to FIG. 1 and FIG. 4.

In FIG. 3, a mask configuration is indicated by a dotted dash line and a configuration actually formed is indicated by a solid line. In the vicinity of the tip portion 921, as has been described above, the pattern accuracy is lowered due to a reflection effect from the first filling material layer 86 and the second filling material layer 90. This reflection gives an adverse effect not only the tip portion 921 of the first filling material layer 86 but also to the pattern accuracy of the tip portion 921 on the write gap layer 84. Here, on the write gap range 84, a "reflection effect range A" is defined as a distance of a pattern accuracy lowering from the tip portion 861 of the first filling material layer.

A total of 52 thin film magnetic heads 70 (see FIG. 15 to FIG. 18) were prepared to measure the reflection effect range A. The results are shown as a frequency distribution in FIG. 4.

As is clear from FIG. 4, in order to prevent the pattern accuracy deterioration at the ABS 76 of the tip portion 921, it is necessary the tip 861 of the first filling material layer be at a distance of at least 4 micrometers from the ABS 76.

In the present embodiment; L<D as shown in FIG. 2. That is, the tip portion 121 is entirely on the flat write gap 84. On the other hand, as is clear from the results of FIG. 4, on the write gap, a portion apart from the tip 861 of the first filling material layer by more than the reflection effect range A (4.6 micrometers for example), is not subjected to the reflection effect.

Consequently, the pattern forming accuracy of the tip portion 121 at the ABS 76 is increased if the tip 861 of the first filling material layer 86 is at a distance from the ABS76 greater than the reflection effect range A (4.6 micrometers for example).

Moreover, the rear width $W_1$ of the wide rear portion 122 has a width about four times greater than the tip width W. During an exposure step, the reflection light is reflected by the flat write gap layer 80 and this does not affect the formation accuracy of the tip width W.

Next, explanation will be given on the recording operation of the thin film magnetic head 10, i.e., mechanism of recording magnetic field generation from the write gap layer 84.

The magnetic flux restricted or focused narrower by the flare portion 123 passes through the wide rear portion 122 having the rear width $W_1$ greater than the tip width 4 by four times or more. Thus, the cross sectional area where the magnetic flux passes becomes about four times greater than in the conventional apparatus. This suppresses concentration of the flux and the increase of the magnetic reluctance. Thus, it is possible to obtain a large within-gap magnetic field in the write gap in contact with the tip portion 121 and the wide rear portion 122.

The recording magnetic field is generated by leak of a part of the magnetic field in the gap from the ABS76 through the narrow tip portion 121 having a high magnetic reluctance. Accordingly, like in the conventional apparatus, if the length L of the tip portion is too large, the magnetic reluctance is increased by the magnetic saturation in the tip portion 121 and the recording magnetic field is lowered. However, in the present embodiment, the entire tip portion 121 is formed on the write gap layer 84 which is not stepped but flat. This increases the pattern formation accuracy and it is possible to make the tip length L as about ½ of the tip width L (recording track width).

Figure 5:
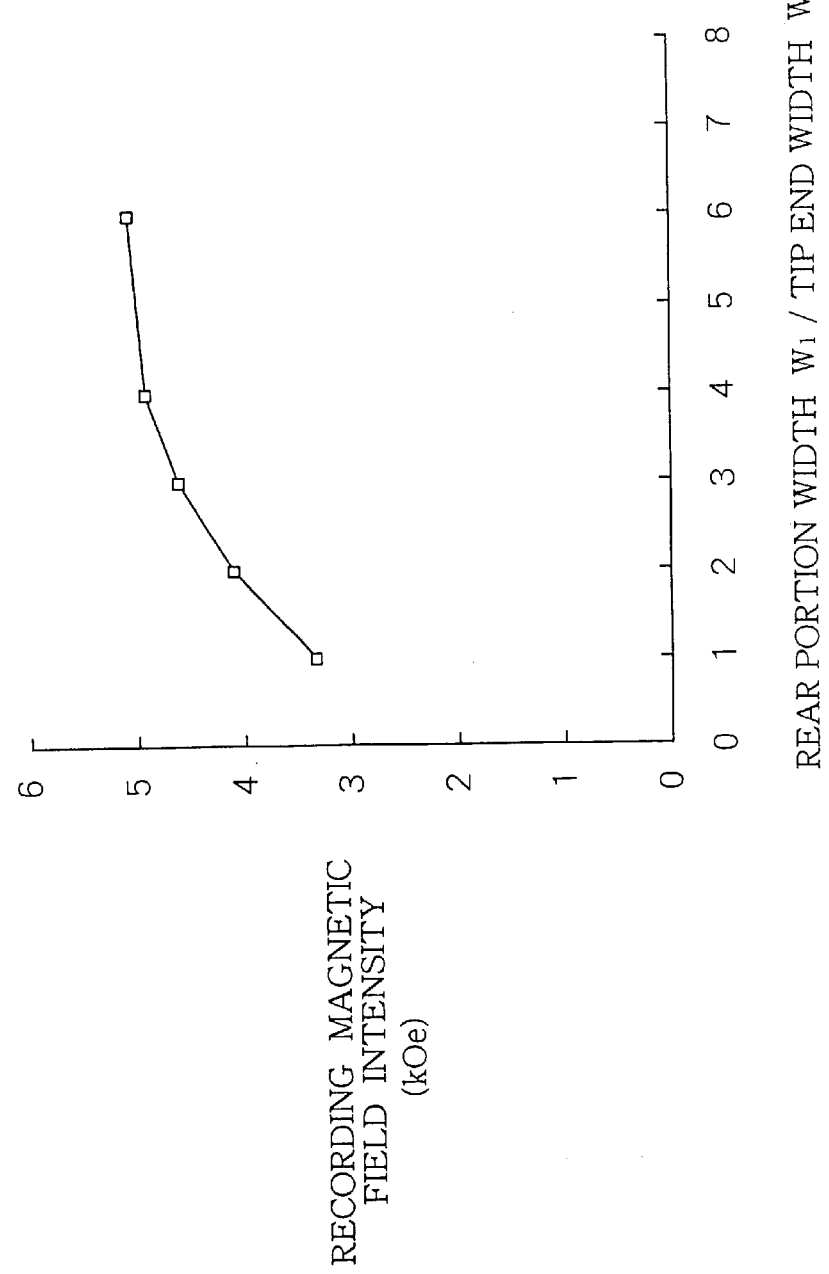
FIG. 5 is a graph showing a relationship between the (rear width $W_1$/tip width) and the recording magnetic field intensity in the thin film magnetic head of FIG. 1.

FIG. 5 is a graph showing the relationship between [rear portion width $W_1$/tip width W] and the recording magnetic field intensity. Hereinafter, explanation will be given, referring to FIG. 1, FIG. 2, and FIG. 5.

When the wide rear portion 122 introduces the magnetic flux from the flare portion 123 into the tip portion 121, it is necessary that the wide rear portion 122 have a magnetic reluctance smaller than the tip portion 121, so that the recording magnetic field is not lowered because of saturation of the wide rear portion 122 earlier than the tip portion.

That is, an appropriate rear portion width $W_1$ is determined according to the tip width W, i.e., recording track width.

FIG. 5 shows calculation results of the recording magnetic field intensity in relation to the [rear portion width $W_1$/tip width W]. If the $W_1$/W value is 1, it is impossible to obtain a recording magnetic field intensity sufficient for the magnetic saturation of the wide rear portion 122. When the [rear portion width $W_1$/tip width W] is in a range from 2 to 4, the magnetic saturation in the wide rear portion 122 is mitigated, which in turn increases the recording-magnetic field intensity. Furthermore, when the [rear portion width $W_1$/tip width W] is about 4 or more, the recording magnetic field intensity is already saturated. Consequently, the $W_1$/W value is preferably 4 or more where the recording magnetic field is saturated.

Moreover, when the magnetic flux is introduced from the lower pole layer 82 to pass through the center of the coil pattern layer 88 reaching the recording pole layer 12, the magnetic flux amount is restricted by the pole window width $W_2$ of the pole window 94.

Accordingly, if $W_1 > W_2$, the recording magnetic intensity depends on the magnetic saturation in the pole window 94 and increase of the magnetic reluctance rather than the wide rear portion 122. Consequently, $W_1 < W_2$ is indispensable to obtain a sufficient magnetic effect.

Next, referring to FIG. 1 to FIG. 5. Explanation will be given on the function and effect of the thin film magnetic head 10.

The thin film magnetic head 10 has the recording pole layer 12 constituted by the tip portion 121 and the wide rear portion which are on the write gap layer 84 and a flare portion 123 and a yoke portion 124 which are on the first filling material layer 86 and the second filling material layer 90.

If the wide rear portion 122 has a rear portion width $W_1$ which is four times greater than the tip width, it is possible to effectively pass the magnetic flux to the tip portion 121 without magnetic saturation of the wide rear portion 122 due to the magnetic flux focused by the flare portion 123 or increase of the magnetic reluctance.

Moreover, if the wide rear portion 122 has a width $W_1$ smaller than the width $W_2$ (see FIG. 15 and FIG. 16), the pole window 94 will never be magnetically saturated prior to the wide rear portion 122 and the magnetic effect will not be lowered.

When the tip portion 121 which determines the recording track width is formed entirely on the flat write gap layer 84 and if the first filling material layer 88 has a tip portion 861 which is apart from the ABS 76 extending more than the reflection effect range A and more preferably, apart from the SBS 76 by 4 micrometers, in the exposure step, the light reflection due to a stepped portion will not adversely affect the pattern formation accuracy of the tip portion width W. Accordingly, it is possible to reduce the tip length L to ½ of the recording track width while maintaining the tip width W constant. Thus, it is possible to prevent increase of the magnetic reluctance.

In the thin film magnetic head 10, L<D. Accordingly, the recording magnetic field intensity is mainly affected by the tip portion length L. Consequently, the effect of the gap depth D on the recording capability is smaller than in the conventional apparatus, which in turn mitigate the positional accuracy of the tip portion 861 of the first filling material layer 86.

Figure 6:
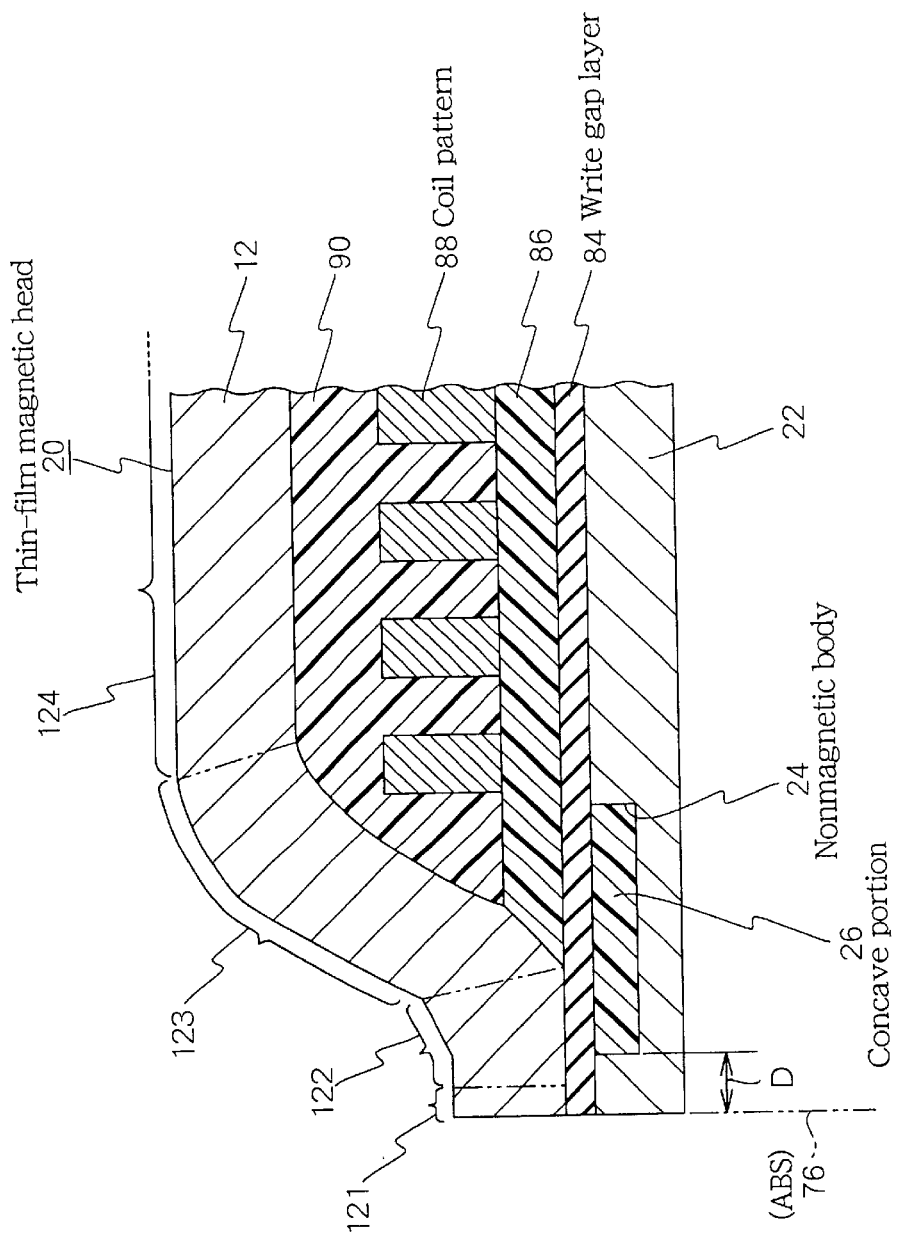
FIG. 6 is a cross sectional view of a thin film magnetic head according to a second embodiment of the present invention.
Figure 7:
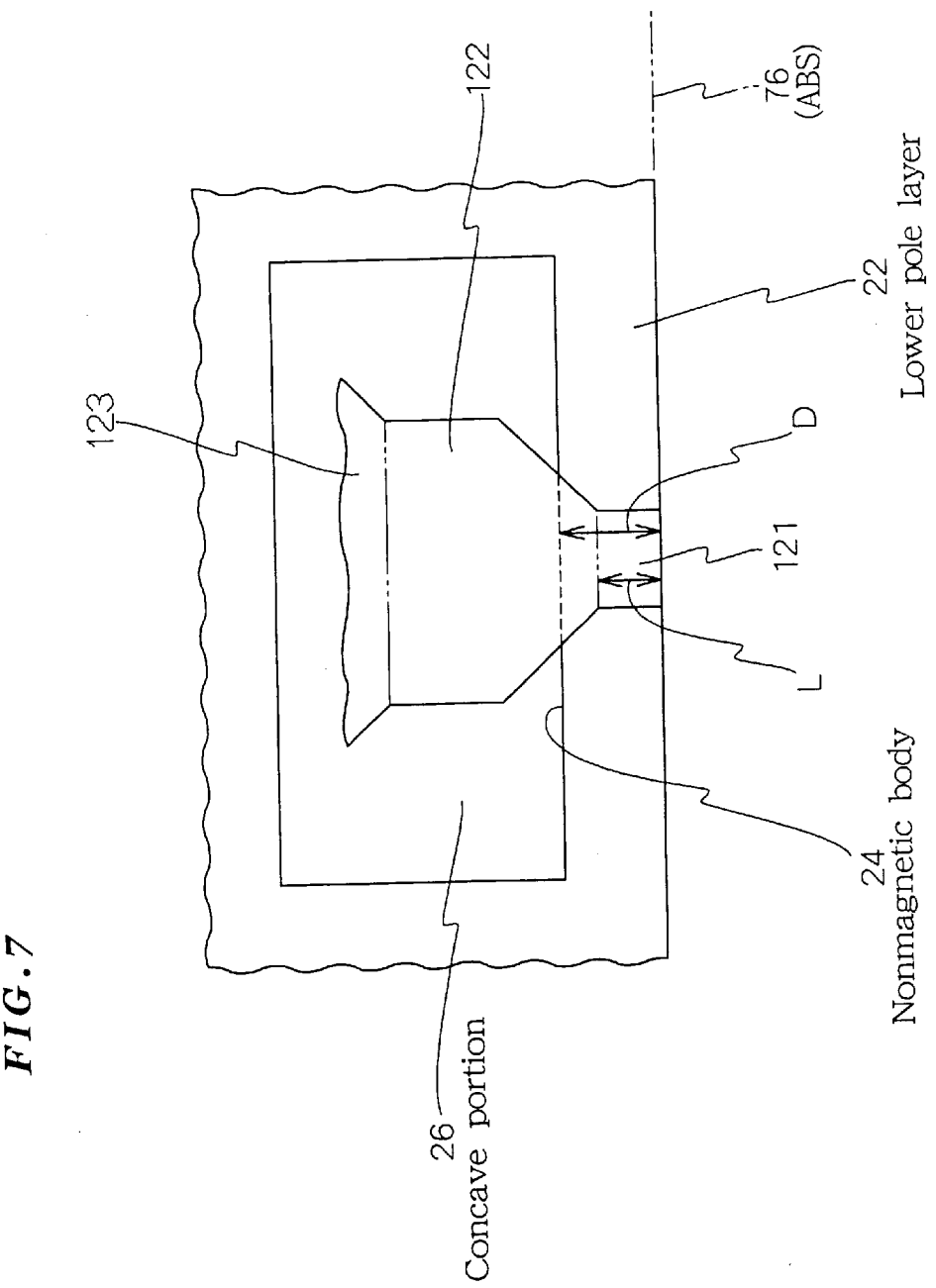
FIG. 7 is a plan view showing the positional relationship between a recording pole layer and a lower pole layer in the thin film magnetic head of FIG. 6.

FIG. 6 is a cross sectional view of a thin film magnetic head according to the second embodiment of the present invention. FIG. 7 shows a positional relationship between the recording pole layer and the lower pole layer of the thin film magnetic head of FIG. 6. Hereinafter, explanation will be given referring to these figures. Note that like component as in FIG. 1 and FIG. 2 are denoted by like reference symbols, and their explanations are omitted below.

In the thin film magnetic head 20 according to the second embodiment, an indentation 24 is provided at a distance from the ABS 76 in the lower pole layer 22. The indentation 24 is filled with a non-magnetic material 26, and the indentation 24 determines the gap depth D between the recording pole layer 12 and the lower pole layer 22.

The indentation 24 is formed in the lower pole layer 22 at a position to oppose to the wide rear portion 122 and the flare portion 122. The indentation 24 has an area equal to or greater than an area (length×width) of the wide rear portion 122. The edge of the indentation 24 at the side of ABS 76 is located at a position to oppose to the wide rear portion 122. The opening of the indentation 24 is filled with the non-magnetic material 26 almost flat with the upper surface of the lower pole layer 22.

The gap depth D is defined as depth of the gap plane where the recording pole layer 12 is magnetically connected with the lower pole layer 22 via the write gap layer 84. Accordingly, the gap depth D in this embodiment is a distance from the ABS 76 to the edge of the indentation at the side of the ABS 76.

The distance between the recording pole layer and the lower pole layer in the wide rear portion 122 is greater than in the first embodiment because by the depth of the indentation 24. Accordingly, the magnetic flux coming from the wide rear portion 122 and passing through the write gap layer 84 to reach the lower pole layer 22 tends to come into the lower pole layer without passing through the indentation as a magnetically vacancy. Thus, the magnetic flux is effectively concentrated at the tip portion 121. Consequently, the second embodiment further increases the recording magnetic field generation effect.

Figure 8:
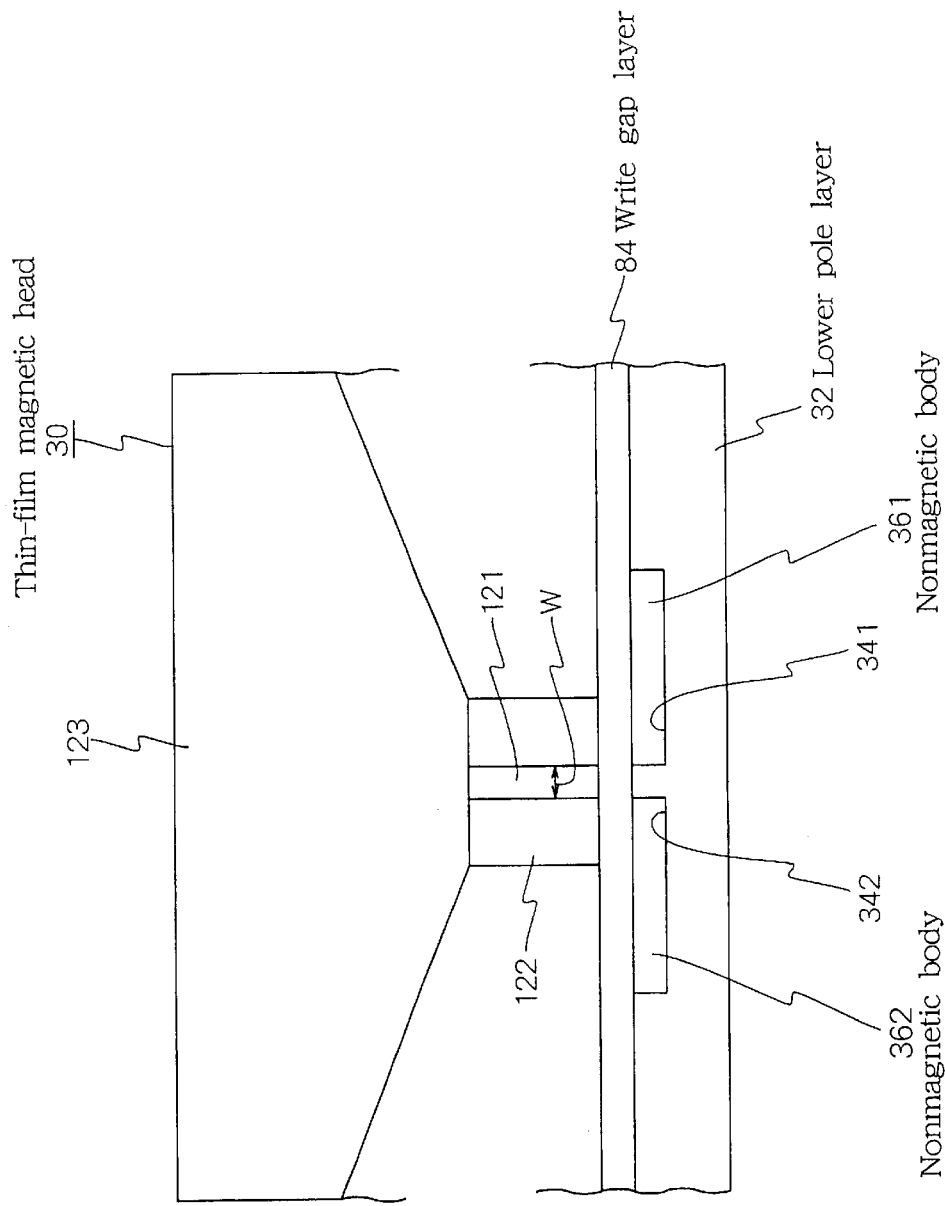
FIG. 8 is a front view of a thin film magnetic head according to a third embodiment of the present invention, viewed from the ABS.

FIG. 8 is a front view of a thin film magnetic head according to the third embodiment (lower pole layer trim) of the present invention, viewed from the ABS 76. Hereinafter, explanation will be given referring to FIG. 8. Like components as in FIG. 1 and FIG. 2 are denoted by like reference symbols and their explanations are omitted.

In the thin film magnetic head 30 of the third embodiment, the lower pole layer 32 is removed at the side of the ABS 76, leaving a portion opposing to the tip portion 121. In other words a cut-off portion 341 and a cut-off portion 342 are formed on the plane facing the lower pole layer 32, leaving the lower pole layer 32 having a width identical to the tip width W.

The cut-off portions 341 and 342 are formed at both sides of a portion immediately below the tip portion 121 and has a length identical to the gap depth D from the ABS 76, a depth identical to the write gap layer 84, and a width identical to the wide rear portion 122. The cut-off portions 341 and 342 are filled with a non-magnetic material 361, 362.

The cut-off portions 341 and 342 function in such a manner that the recording magnetic field coming from the center portion 121 is not spread in the track width direction.

Figure 9:
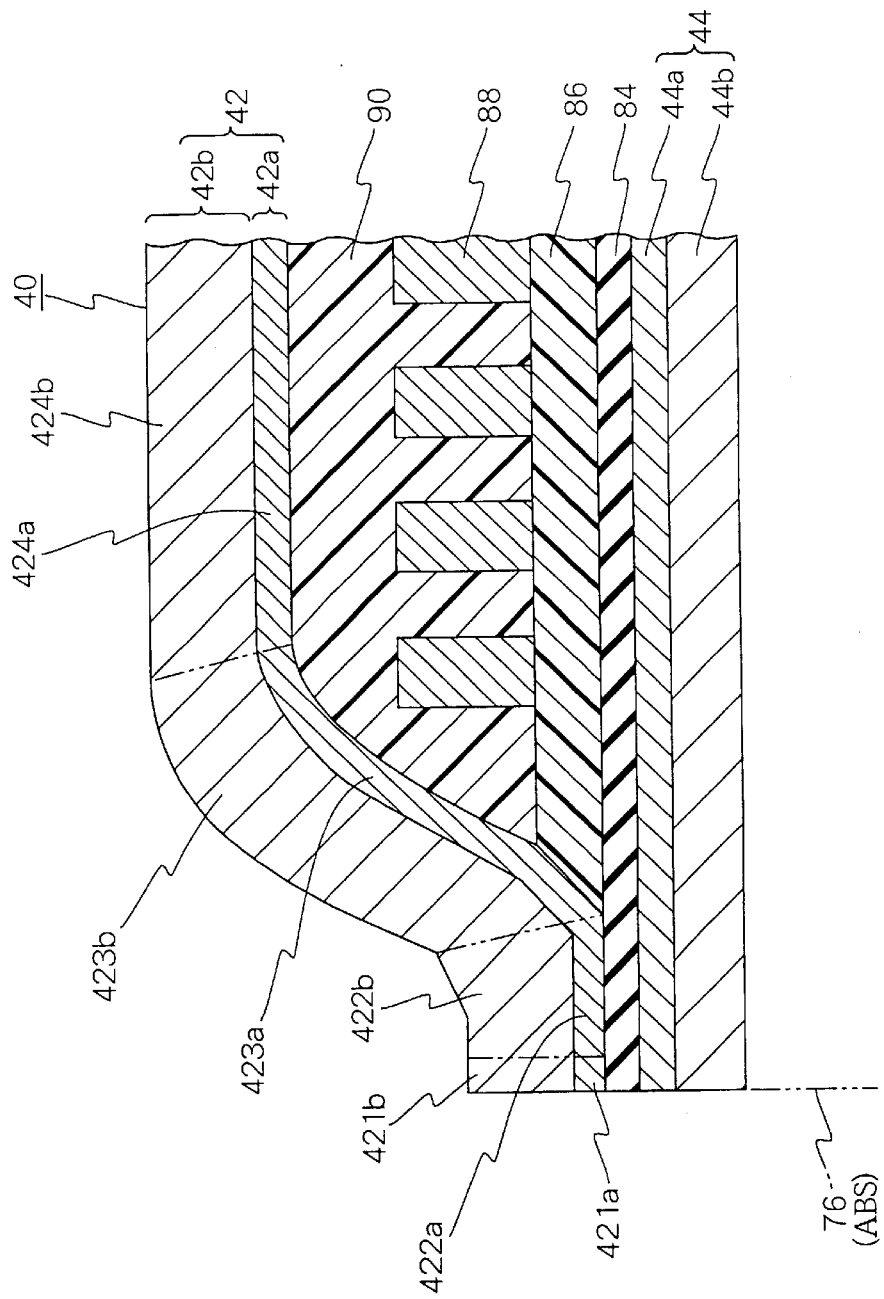
FIG. 9 is a cross sectional view of a thin film magnetic head according to a fourth embodiment of the present invention.

FIG. 9 is a cross sectional view of a thin film magnetic head 40 according to a fourth embodiment of the present invention. Hereinafter, explanation will be given with reference to this figure.

In the thin film magnetic head 40 of the fourth embodiment, the recording pole layer 42 has a double layer configuration consisting of a first recording pole layer 42a and a second recording pole layer 42; the lower pole layer 44 also has a double layer configuration consisting of a first lower pole layer 44b and a second lower pole layer 44a.

For example, the first recording pole layer 42a and the second lower pole layer 44 may be formed using a high saturation magnetic flux density (Bs) such as CoNiFe (Bs= 1.8 to 2.1 T) and CoZrTa (Bs=1.4 to 1.6 T). The second recording pole layer 42b and the first lower pole layer 44b are formed using NiFe (Bs=1.0 T).

Moreover, the recording pole layer 42 is divided into tip portions 421a and 421b, side rear portions 422a and 422b, flare portions 423a and 423b, and yoke portions 424a and 424b in this order viewed from the ABS 76.

When a high Bs material is applied to the recording pole layer 42a and to the lower pole layer 44a, it is possible to mitigate the saturation of the recording pole layer 42a and the lower pole layer 44 in the vicinity of the ABS 76. Thus, increase of the recording magnetic field and the improvement of the recording magnetic field gradient enable to perform a saturation recording even for a magnetic recording medium having a high Hc. It should be noted that the same improvement can also be obtained by forming the recording pole layer 42 and the lower pole layer 44 by using a single-layered high Bs material.

Figure 10:
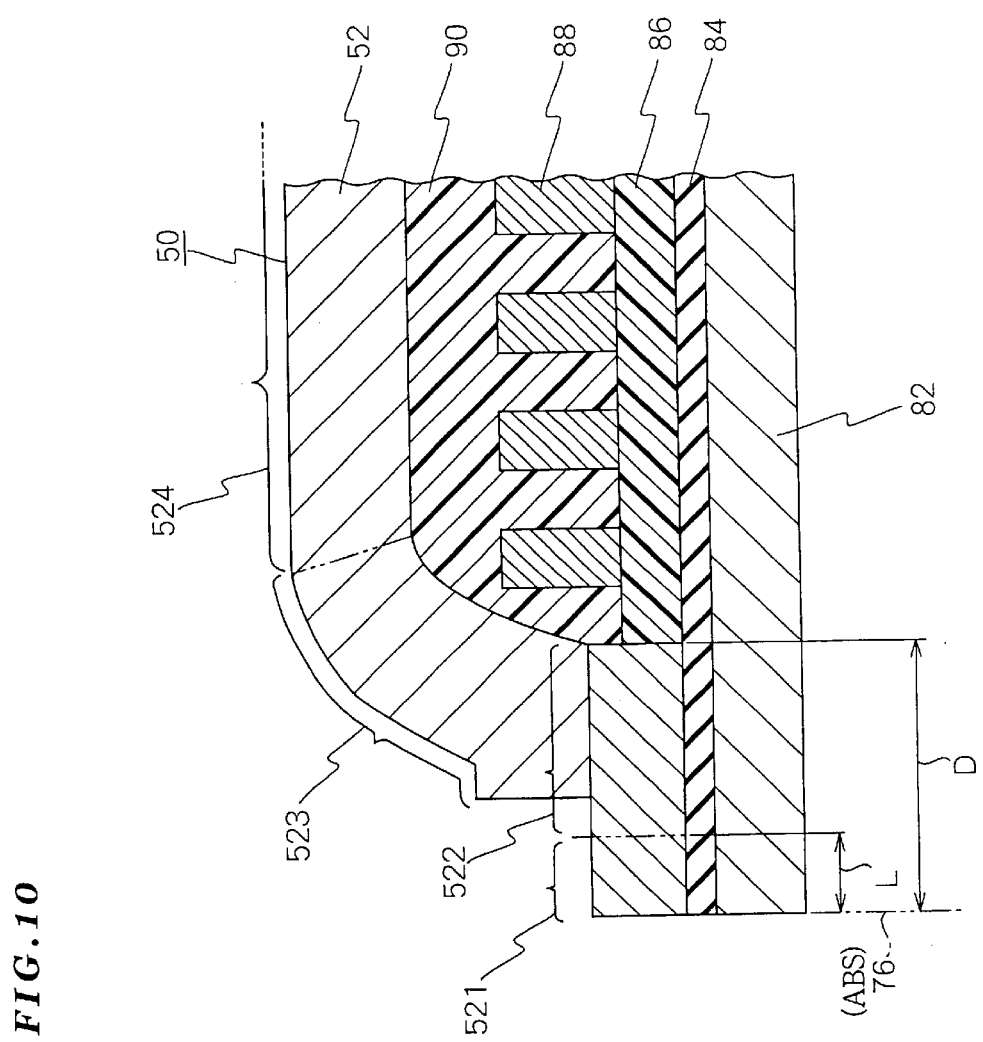
FIG. 10 is a cross sectional view of a thin film magnetic head according to a fifth embodiment of the present invention, viewed about the line X—X in FIG. 11.
Figure 11:
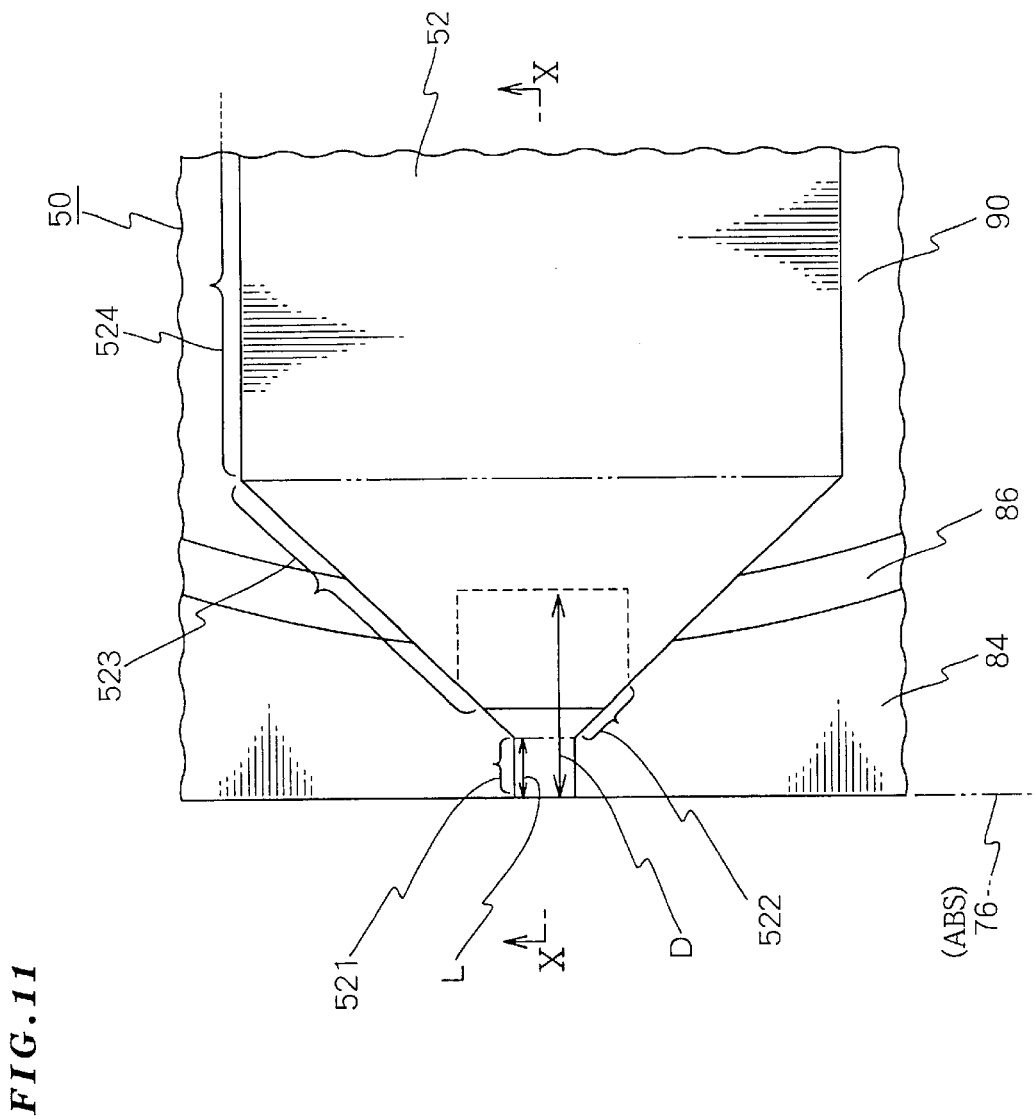
FIG. 11 is a plan view of the thin film magnetic head of FIG. 10.

FIG. 10 is a cross sectional view of a thin film magnetic head according to a fifth embodiment of the present invention viewed about the line X—X in FIG. 11, which is a plan view of the thin film magnetic head of FIG. 10. Hereinafter, explanation will be given with reference to these figures.

In the thin film magnetic head 50 of the fifth embodiment, the recording pole layer 52 is divided into a tip portion 521, a wider rear portion 522. The tip portion and the wide rear portion have bottoms in direct contact with upper surface of the write gap layer 84, and the flare portion 523 is layered on a part of the wide rear portion 522.

The thin film magnetic head 50 is produced as follows. Firstly, the write gap layer 84 is formed on the lower pole layer 82. Then, on the write tap layer 84, the tip portion and the wide rear portion 522 are formed by plating. Subsequently, the first filling material layer 86, the coil pattern layer 88, and the second filling material layer 90 are formed, and the flare portion 523 and the yoke portion 524 are formed by plating. Here, the tip of the flare portion 523 is in contact with and magnetically connected to a rear portion of the wide rear portion 522.

Thus, behind the ABS 76, the tip portion 521 and the wide rear portion 522 are formed on the flat write gap layer 84 having no stepped portion. This further improves the pattern accuracy.

Moreover, the distance between the ABS 76 and the tip of the first filling material layer 86 is not restricted by the reflection affect range A (FIG. 3), and at least greater than the tip portion length L.

Furthermore, the resist frame for plating may have a height corresponding to the thickness of the tip portion 521 and the wide rear portion 522 such as 4 micrometers for example. Accordingly, even if the track width is smaller than 1 micrometer, it is possible to maintain the pattern accuracy of the tip portion 521.

When the track width is equal to or smaller than 1 micrometer, there arises a problem of alignment accuracy of the connection between the wide rear portion 522 and the flare portion 523. However, in this embodiment, the wide rear portion 522 has a back portion four times greater than the track width. This mitigates the alignment accuracy, causing no unnecessary increase of the magnetic reluctance at the connection.

Figure 12:
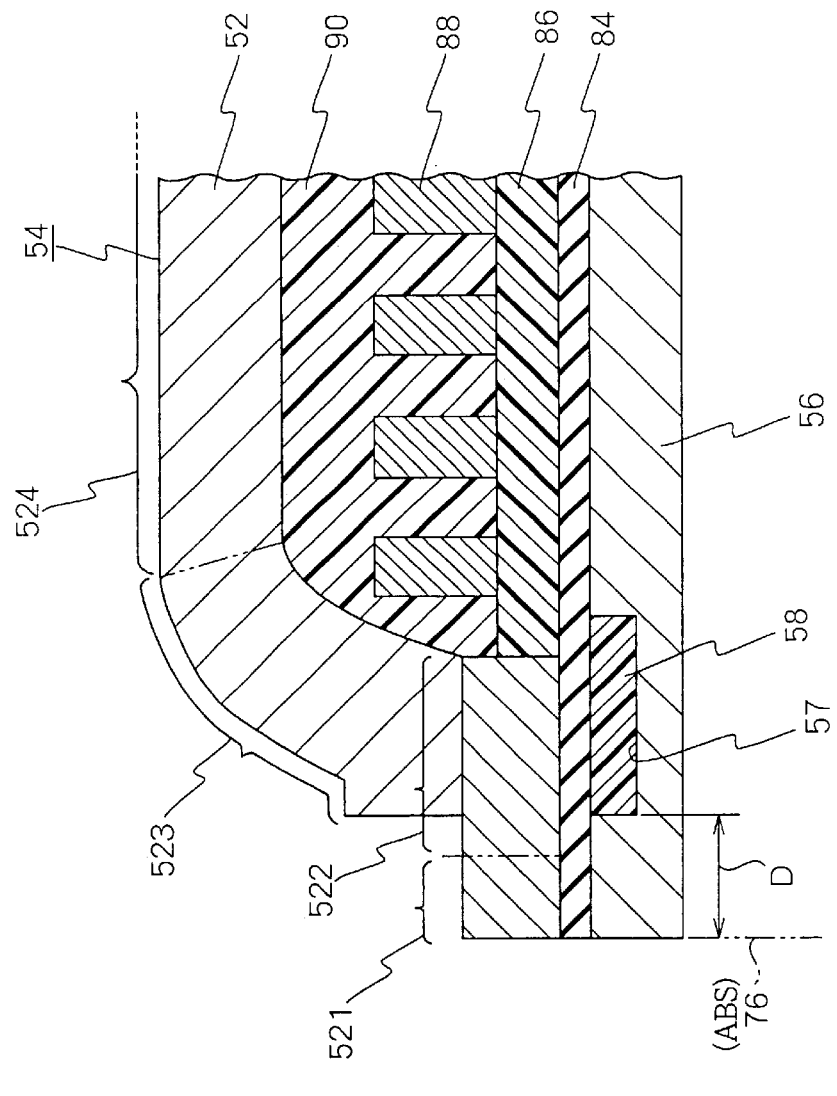
FIG. 12 is a cross sectional view of a thin film magnetic head according to a sixth embodiment of the present invention.

FIG. 12 is a cross sectional view of a thin film magnetic head according to a sixth embodiment of the present invention. Hereinafter, explanation will be given with reference to this FIG. 12.

In the thin film magnetic head 54 of the sixth embodiment, an indentation 57 is provided in the lower pole layer 56 apart from the ABS 76. The indentation 57 is filled with a non-magnetic material 58. This indentation 57 determines the gap depth D between the recording pole layer 52 and the lower pole layer 56.

The sixth embodiment is realized by applying the second embodiment to the fifth embodiment of the present invention. It is possible to obtain the same effect as the second embodiment. It should be noted that it is also possible to apply the third embodiment or the fourth embodiment to the fifth embodiment.

Figure 13:
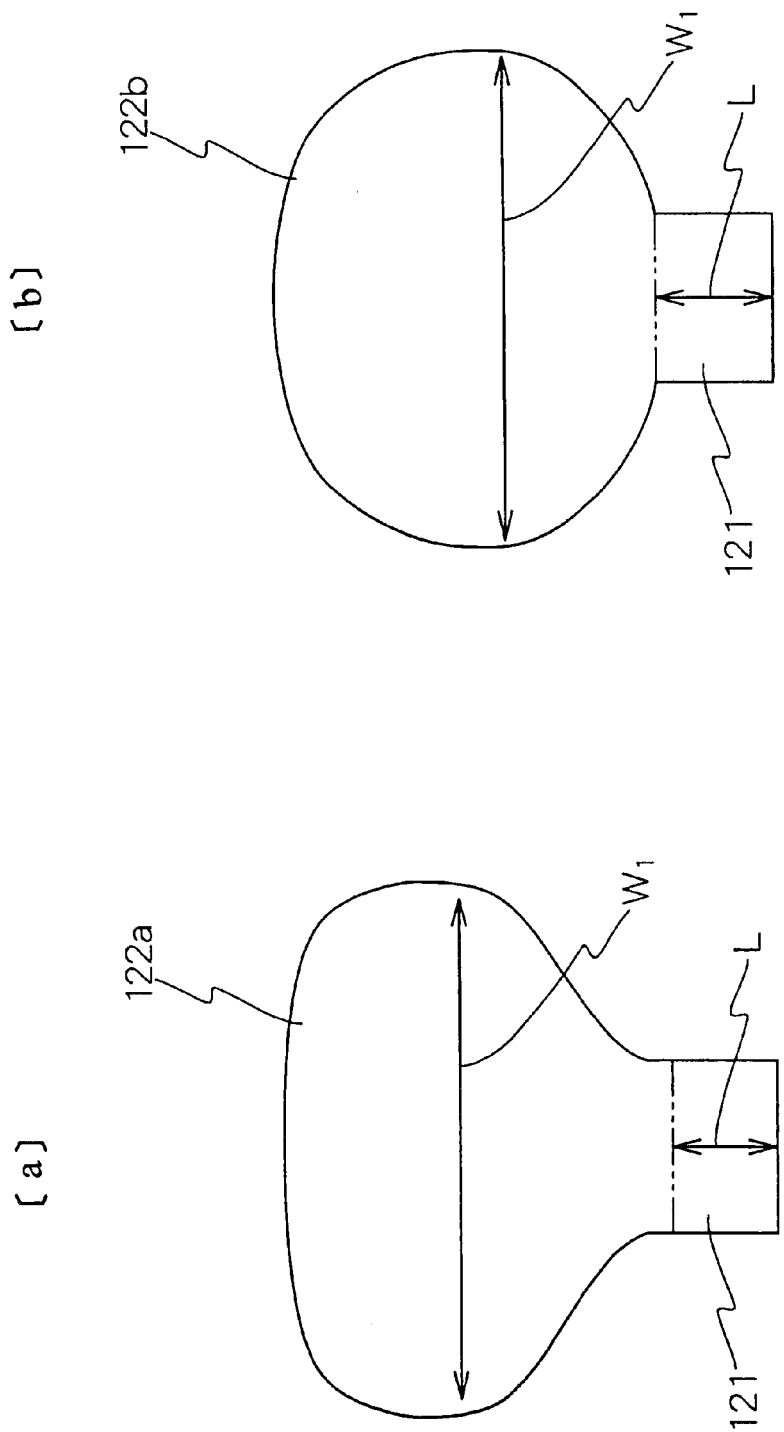
FIG. 13A and FIG. 13B are plan views of a first example and a second example of a thin film magnetic head according to a seventh embodiment of the present invention.

FIG. 13 shows configuration of the wide rear portion in the thin film magnetic head according to the seventh embodiment. FIG. 13A shows a first example and FIG. 13B shows a second example of the configuration of the wide rear portion 122a, 122b. Hereinafter, explanation will be given with FIG. 13A and FIG. 13B.

In this embodiment, the wide rear portions 122a, 122b respectively have a rounded configuration having a predetermined width $W_1$ at least at a part of the wide rear portions 122a, 122b. In general, the magnetic field concentrated at the corner of the flare portion of the wide rear portion increases a useless magnetic field leak not passing through the tip portion. However, in this embodiment, the wide rear portions 122a, 122b have curved corners, thus further increasing the recording magnetic field generation efficiency.

Figure 14:
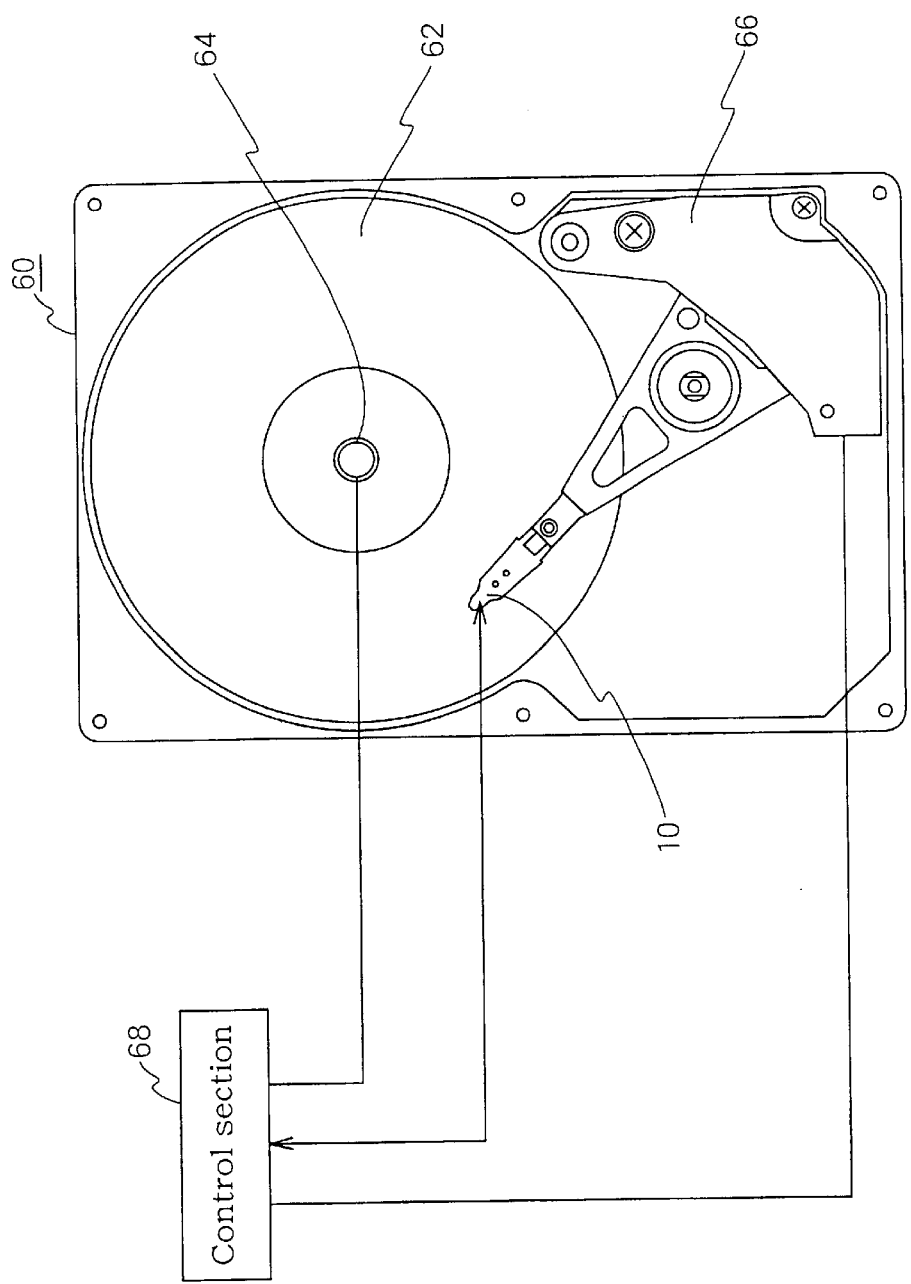
FIG. 14 shows configuration of an embodiment of a magnetic recording apparatus using the thin film magnetic head according to the present invention.
Figure 15:
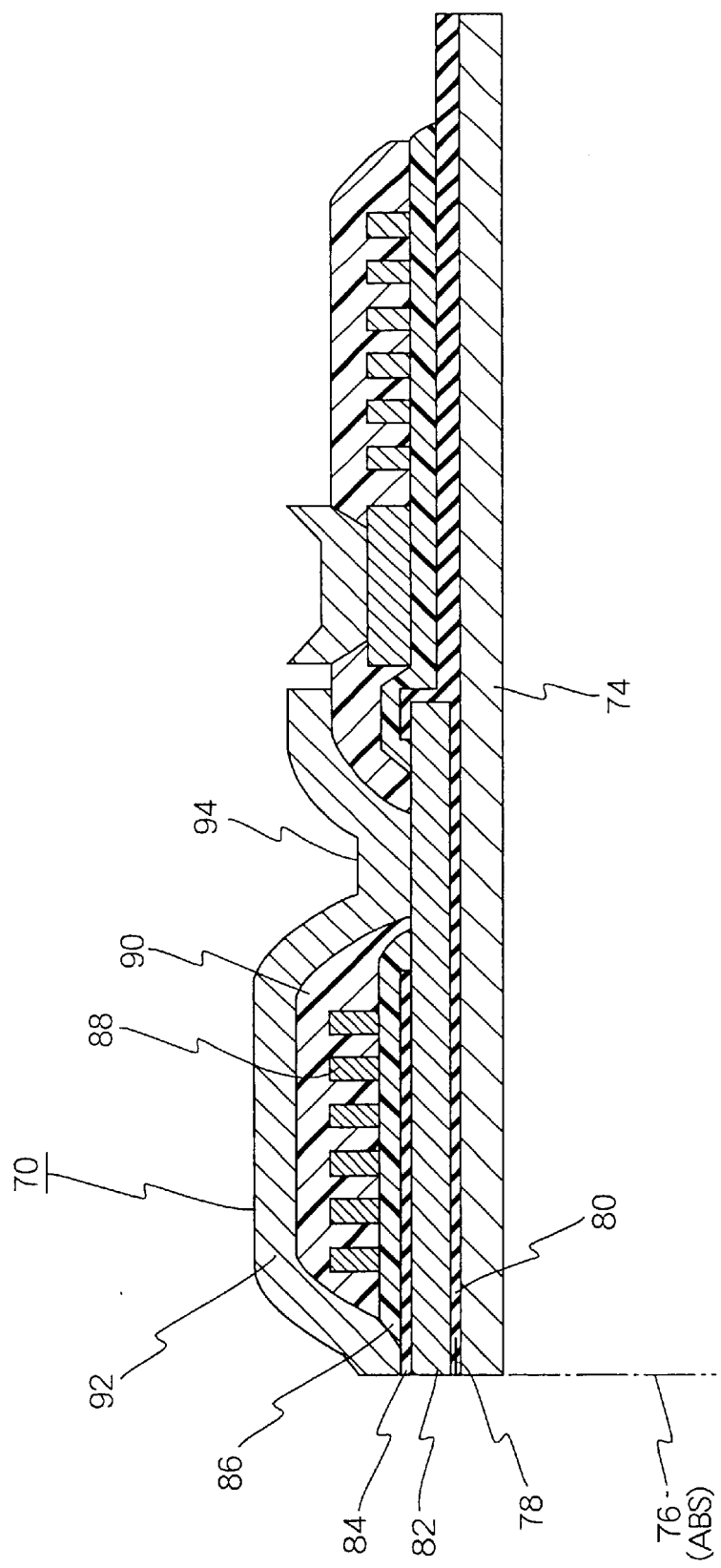
FIG. 15 is a cross sectional view of a conventional thin film magnetic head viewed about the line XY—XY in FIG. 16.
Figure 16:
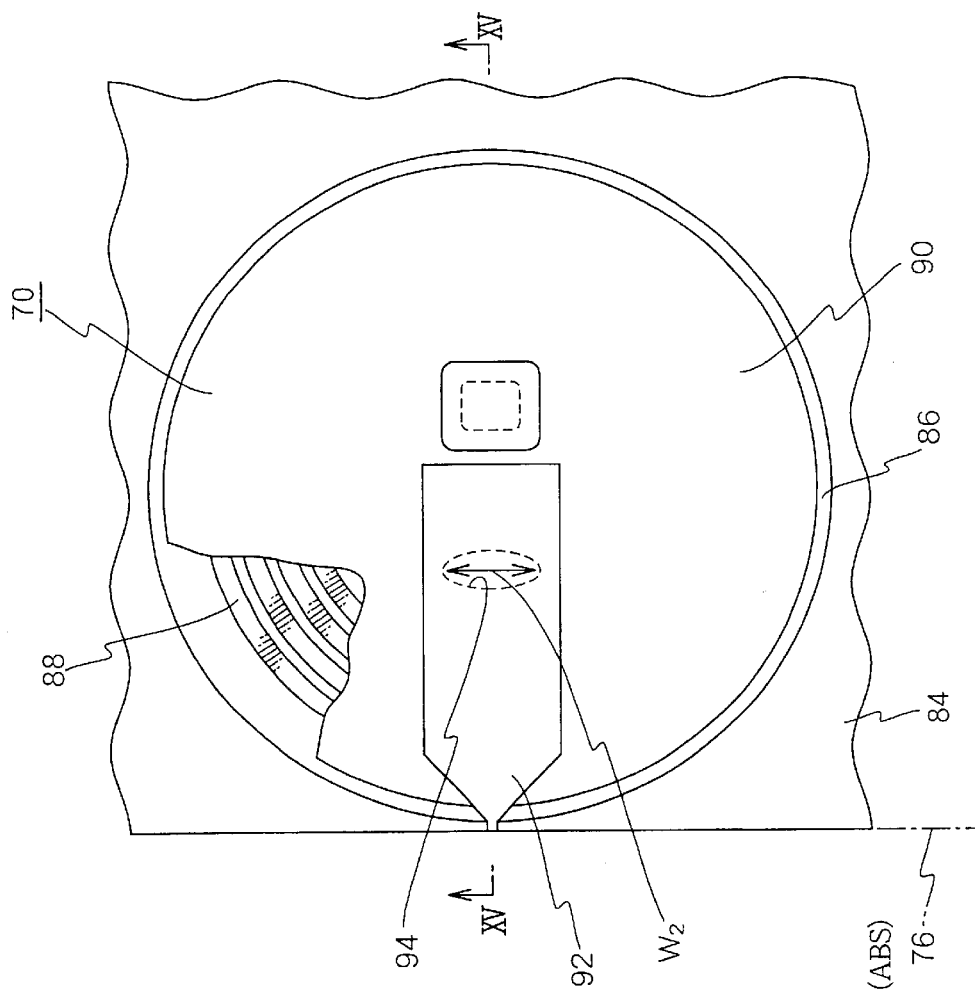
FIG. 16 is a plan view of the conventional thin film magnetic head of FIG. 15.
Figure 17:
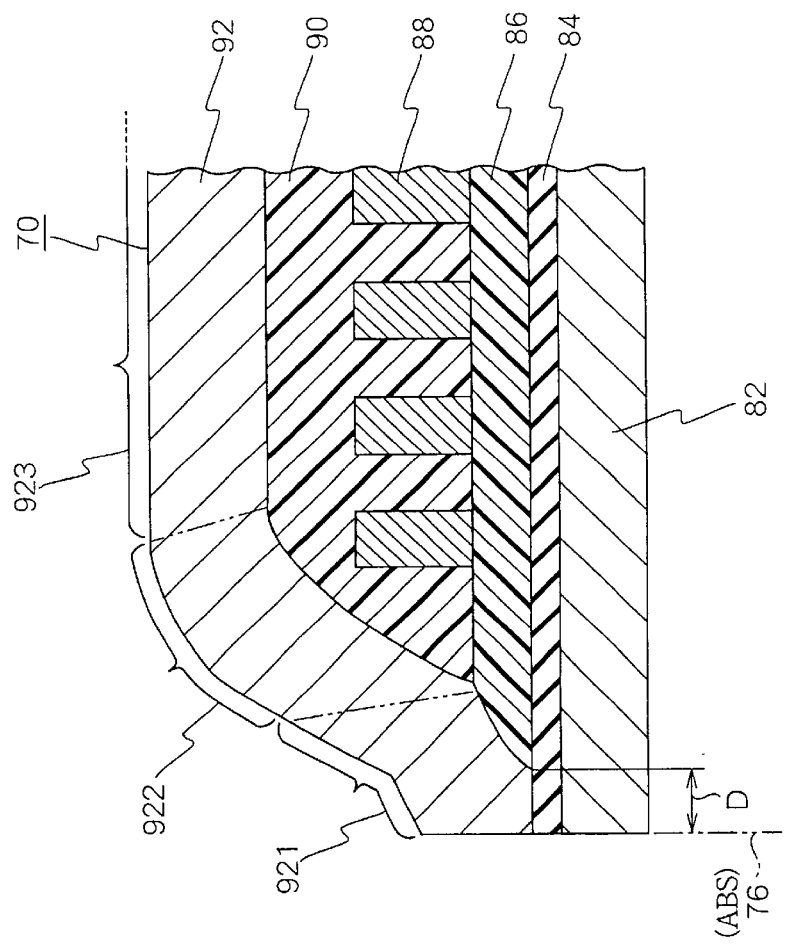
FIG. 17 is an enlarged cross sectional view of the conventional thin film magnetic head of FIG. 15, viewed about the line XVII—XVII in FIG. 18.
Figure 18:
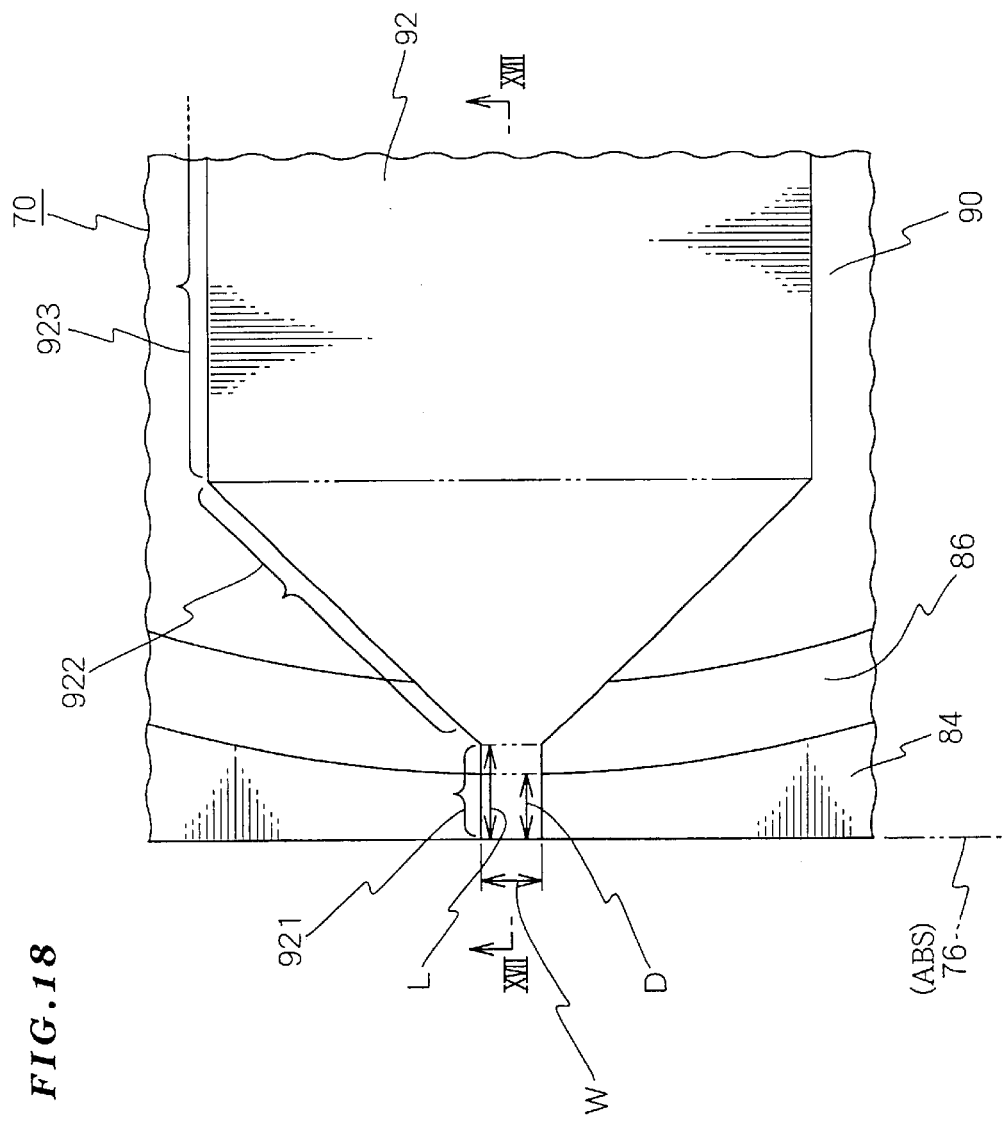
FIG. 18 is an enlarged plan view of the thin film magnetic head of FIG. 16.

FIG. 14 schematically shows an embodiment of a magnetic recording apparatus using the thin film magnetic head according to the present invention. Hereinafter, explanation will be given with reference to this FIG. 14.

The magnetic recording apparatus 60 according to this embodiment includes: the thin film magnetic head 10 according to the first embodiment; a magnetic storage medium 62; a spindle motor 64 for rotating the magnetic storage medium 62; a voice coil motor 66 for moving the thin film magnetic head 10 over the magnetic storage medium 62; and a control block (not depicted) operating according to an instruction from an upper node device.

The control block 68 drives the spindle motor 64 and the voice coil motor 66 and performs data recording and reproduction to/from the magnetic storage medium 62 using the thin film magnetic head 10. Because the thin film magnetic head 10 is used, it is possible to provide a magnetic recording medium having a high recording density.

It should be noted that the present invention is not to be limited to the aforementioned embodiments. For example, the present invention can be applied not only to a thin film magnetic head of the inductive type, but also to an MR-inductive composite-type thin film magnetic head, or a composite thin film magnetic head using a reproduction head other than the MR type and an inductive type recording head.

In the thin film magnetic head according to the present invention, the magnetic reluctance is reduced by providing a wide rear portion between the recording pole layer tip portion and the flare portion. Because the flare portion where a large amount of light is reflected is provided at a distance from the ABS, it is possible to improve the pattern accuracy at the tip portion as well as to prevent increase of the magnetic reluctance. Accordingly, it is possible to form the tip portion with a high accuracy without increasing the magnetic reluctance at the tip of the recording pole layer.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. A10-200597 (Filed on Jul. 15, 1998) including specification, claims, drawings and summary are incorporated herein by reference in its entirety.

What is claimed is:

1. A thin film magnetic head, comprising:
    a lower pole layer having a uniform thickness and extending in a perpendicular plane away from an air bearing surface (ABS);
    a write gap layer formed on the lower pole layer;
    a first filling material layer, a coil pattern layer, and a second filling material layer, which are successively formed in this order on the write gap layer excluding a vicinity of the ABS; and
    a recording pole layer comprising a tip portion of a first uniform width, a wide rear portion, a flare portion, and a yoke portion, wherein the tip portion and the wide rear portion directly contact the write gap layer and are separated from the lower pole layer by a thickness of the write gap layer, the wide rear portion has a greater width than the tip portion, a tip width, W, of the tip portion establishes a recording track width, and the wide rear portion extends from the flare portion at a second uniform width and then reduces its width from the second uniform width to a width equal to the first uniform width of the tip portion.

2. A thin film magnetic head as claimed in claim 1, wherein the flare portion is located between the wide rear portion and the yoke portion.

3. A thin film magnetic head, comprising:

a lower pole layer having a uniform thickness and extending in a perpendicular plane away from an air bearing surface (ABS);

a write gap layer formed on the lower pole layer;

a first filling material layer, a coil pattern layer, and a second filling material layer, which are successively formed in this order on the write gap layer excluding a vicinity of the ABS; and a recording pole layer comprising a tip portion of a uniform width, a wide rear portion, a flare portion, and a yoke portion, wherein the tip portion and the wide rear portion directly contact the write gap layer and are separated from the lower pole layer by a thickness of the write gap layer, the wide rear portion has a greater width than the tip portion, and a tip width, W, of the tip portion establishes a recording track width, wherein the flare portion gradually reduces its width from the yoke portion toward the wide rear portion and has a predetermined width in contact with the wide rear portion, and wherein the wide rear portion reduces its width from the predetermined width to a width equal to the uniform width of the tip portion.

4. A thin film magnetic head as claimed in claim 3, wherein the predetermined width is at least four times greater than the uniform width of the tip portion.

5. A thin film magnetic head comprising:

a lower pole layer having a uniform thickness and extending in a perpendicular plane away from an air bearing surface (ABS);

a write gap layer formed on the lower pole layer;

a first filling material layer, a coil pattern layer, and a second filling material layer, which are successively formed in this order on the write gap layer excluding a vicinity of the ABS; and a recording pole layer comprising a tip portion of a uniform width, a wide rear portion, a flare portion, and a yoke portion, wherein the tip portion and the wide rear portion directly contact the write gap layer and are separated from the lower pole layer by a thickness of the write gap layer, the wide rear portion has a greater width than the tip portion, and a tip width, W, of the tip portion establishes a recording track width, and wherein the first filling material layer is separated from the ABS by at least 4 micrometers.

6. A thin film magnetic head, comprising:

a write gap layer formed on a lower pole layer and extending in a perpendicular plane away from an air bearing surface (ABS);

a first filling material layer, a coil pattern layer, and a second filling material layer, which are successively formed in this order on the write gap layer excluding a vicinity of the ABS; and a recording pole layer comprising a tip portion of a uniform width, a wide rear portion, a flare portion, and a yoke portion, wherein the tip portion and the wide rear portion directly contact the write gap layer and are separated from the lower pole layer by a thickness of the write gap layer, an indentation is provided in the lower pole layer, an edge of the indentation being parallel to the ABS and located beneath the wide rear portion, and the indentation is filled with a non-magnetic material that determines a gap depth between the recording pole layer and the lower pole layer, and the wide rear portion contacts the tip portion between the ABS and the gap depth.

7. A thin film magnetic head comprising:

a lower pole layer having a uniform thickness and extending in a perpendicular plane away from an air bearing surface (ABS);

a write gap layer formed on the lower pole layer;

a first filling material layer, a coil pattern layer, and a second filling material layer, which are successively formed in this order on the write gap layer excluding a vicinity of the ABS; and a recording pole layer comprising a tip portion of a uniform width, a wide rear portion, a flare portion, and a yoke portion, wherein the tip portion and the wide rear portion directly contact the write gap layer and are separated from the lower pole layer by a thickness of the write gap layer, the wide rear portion has a greater width than the tip portion, and a tip width, W, of the tip portion establishes a recording track width, and wherein portions of the lower pole layer on the ABS surface and contacting the write gap layer are removed, leaving a portion of the lower pole layer opposing the tip portion and having a same width as the tip portion.

8. A thin film magnetic head comprising:

a lower pole layer having a uniform thickness and extending in a perpendicular plane away from an air bearing surface (ABS);

a write gap layer formed on the lower pole layer;

a first filling material layer, a coil pattern layer, and a second filling material layer, which are successively formed in this order on the write gap layer excluding a vicinity of the ABS; and a recording pole layer comprising a tip portion of a uniform width, a wide rear portion, a flare portion, and a yoke portion, wherein the tip portion and the wide rear portion directly contact the write gap layer and are separated from the lower pole layer by a thickness of the write gap layer, the wide rear portion has a greater width than the tip portion, and a tip width, W, of the tip portion establishes a recording track width, and wherein at least a portion of the recording pole layer and a portion of the lower pole layer opposing the write gap layer comprise a material having a saturation magnetic flux density of 1.4 T or more.

9. A thin film magnetic head as claimed in claim 1, wherein the material comprises at least one of CoNiFe and CoZrTa.

10. A thin film magnetic head comprising:
a lower pole layer having a uniform thickness and extending in a perpendicular plane away from an air bearing surface (ABS);
a write gap layer formed on the lower pole layer;
a first filling material layer, a coil pattern layer, and a second filling material layer, which are successively formed in this order on the write gap layer excluding a vicinity of the ABS; and
a recording pole layer comprising a tip portion of a uniform width, a wide rear portion, a flare portion, and a yoke portion,
wherein the tip portion and the wide rear portion directly contact the write gap layer and are separated from the lower pole layer by a thickness of the write gap layer, the wide rear portion has a greater width than the tip portion, and a tip width, W, of the tip portion establishes a recording track width, and
wherein the wide rear portion includes an externally curved configuration including at least a part whose width is at least four times greater than the uniform width of the tip portion.

11. An MR-inductive composite type thin film magnetic head comprising:
a lower shield layer formed on an insulation substrate; and
a read gap layer formed on the lower shield layer, an MR magnetically sensitive element, which faces the ABS, being inserted into the read gap layer, and the thin film magnetic head as claimed in claim 1 being formed on the read gap layer.

12. A magnetic storage apparatus comprising the thin film magnetic head as claimed in claim 11, a magnetic storage medium, and a drive that causes a relative movement between the magnetic storage medium and the thin film magnetic head.

13. A method for producing a thin film magnetic head, comprising:
forming a lower pole layer having a uniform thickness that extends in a perpendicular plane away from an air bearing surface (ABS);
forming a write gap layer on the lower pole layer;
successively forming a first filling material layer, a coil pattern layer, and a second filling material layer on the write gap layer excluding a vicinity of the ABS; and
forming a recording pole layer, comprising:
a yoke portion and a flare portion that cover the first filling material layer, the coil pattern layer, and the second material filling layer; and
a tip portion of a first uniform width and a wide rear portion that directly contact the write gap layer and are separated from the lower pole layer by a thickness of the write gap layer, wherein
a tip width, W, of the tip portion establishes a recording track width, and
the wide rear portion extends from the flare portion at a second uniform width and then reduces its width from the second uniform width to a width equal to the first uniform width of the tip portion.

14. A method for producing a thin film magnetic head, comprising:
forming a lower pole layer having a uniform thickness that extends in a perpendicular plane away from an air bearing surface (ABS);
forming a write gap layer on the lower pole layer;
successively forming a first filling material layer, a coil pattern layer, and a second filling material layer on the write gap layer excluding a vicinity of the ABS; and
forming a recording pole layer, comprising:
a yoke portion and a flare portion that cover the first filling material layer, the coil pattern layer, and the second material filling layer; and
a tip portion and a wide rear portion that directly contact the write gap layer and are separated from the lower pole layer by a thickness of the write gap layer,
wherein a tip width, W, of the tip portion establishes a recording track width, and
wherein the flare portion gradually reduces its width from the yoke portion toward the wide rear portion and has a predetermined width in contact with the wide rear portion, and wherein the wide rear portion gradually reduces its width from the predetermined width to a width equal to the uniform width of the tip portion.

15. A thin film magnetic head, comprising:
forming a lower pole layer having a uniform thickness that extends in a perpendicular plane away from an air bearing surface (ABS);
forming a write gap layer on the lower pole layer;
successively forming a first filling material layer, a coil pattern layer, and a second filling material layer on the write gap layer excluding a vicinity of the ABS; and
forming a recording pole layer, comprising:
a yoke portion and a flare portion that cover the first filling material layer, the coil pattern layer, and the second material filling layer; and
a tip portion and a wide rear portion that directly contact the write gap layer and are separated from the lower pole layer by a thickness of the write gap layer,
wherein a tip width, W, of the tip portion establishes a recording track width, and
wherein a part of the flare portion overlies a portion of the wide rear portion.

16. A thin film magnetic head as claimed in claim 7, wherein a part of the flare portion overlies a portion of the wide rear portion.

17. A thin film magnetic head, comprising:
a write gap layer formed on a lower pole layer of a uniform thickness, the write gap layer extending in a perpendicular plane away from an air bearing surface (ABS);
a recording pole layer formed on the write gap layer near an air bearing surface, the recording pole layer, comprising:
a tip portion of a first uniform width;
a wide rear portion including a length that connects to the tip portion with a width equal to the first uniform width of the tip portion and another length that gradually expands in width; and
a flare portion, the wide rear portion being interposed between the flare portion and the tip portion, wherein the tip portion and the wide rear portion directly contact the write gap layer and are separated from the lower pole layer by a thickness of the write gap layer,
a tip width, W, of the tip portion establishes a recording track width, and
the wide rear portion extends from the flare portion at a second uniform width and then reduces its width from the second uniform width to a width equal to the first uniform width of the tip portion.

18. A method for producing a thin film magnetic head, comprising:

forming a write gap layer that extends in a perpendicular plane to an air bearing surface (ABS) on a lower pole layer;

successively forming a first filling material layer, a coil pattern layer, and a second filling material layer on the write gap layer excluding a vicinity of the ABS; and forming a recording pole layer, comprising:
- a yoke portion and a flare portion that cover the first filling material layer, the coil pattern layer, and the second material filling layer; and
- a tip portion and a wide rear portion that directly contact the write gap layer and are separated from the lower pole layer by a thickness of the write gap layer;

providing an indentation in the lower pole layer, an edge of the indentation being parallel to the ABS and located beneath the wide rear portion; and filling the indentation with a non-magnetic material, so that, the indentation determines a gap depth between the recording pole layer and the lower pole layer,
  wherein the wide rear portion contacts the tip portion between the ABS and the gap depth.

19. A method for producing a thin film magnetic head comprising:

forming a lower pole layer having a uniform thickness that extends in a perpendicular plane away from an air bearing surface (ABS);

forming a write gap layer on the lower pole layer;

successively forming a first filling material layer, a coil pattern layer, and a second filling material layer on the write gap layer excluding a vicinity of the ABS; and forming a recording pole layer, comprising:
- a yoke portion and a flare portion that cover the first filling material layer, the coil pattern layer, and the second material filling layer; and
- a tip portion and a wide rear portion that directly contact the write gap layer and are separated from the lower pole layer by a thickness of the write gap layer,
  wherein a tip width, W, of the tip portion establishes a recording track width, and removing portions of the lower pole layer facing the ABS surface, which contact the write gap layer, to leave a portion of the lower pole layer opposing the tip portion that has a same width as the tip portion.

20. A method for producing a thin film magnetic head comprising:

forming a lower pole layer having a uniform thickness that extends in a perpendicular plane away from an air bearing surface (ABS);

forming a write gap layer on the lower pole layer;

successively forming a first filling material layer, a coil pattern layer, and a second filling material layer on the write gap layer excluding a vicinity of the ABS; and forming a recording pole layer, comprising:
- a yoke portion and a flare portion that cover the first filling material layer, the coil pattern layer, and the second material filling layer; and
- a tip portion and a wide rear portion that directly contact the write gap layer and are separated from the lower pole layer by a thickness of the write gap layer,
  wherein a tip width, W, of the tip portion establishes a recording track width, and
  wherein the wide rear portion includes a width that is at least four times greater than the uniform width of the tip portion.

21. A thin film magnetic head according to claim 1, wherein a tip length, L, is less than a gap depth, D.

22. A thin film magnetic head according to claim 6, wherein a tip length, L, is less than a gap depth, D.

23. A thin film magnetic head according to claim 17, wherein a tip length, L, is less than a gap depth, D.

24. A thin film magnetic head as claimed in claim 1, wherein the wide rear portion mitigates a magnetic saturation, since the wide rear portion has a width wider than that of the tip portion.

25. A thin film magnetic head as claimed in claim 13, wherein the wide rear portion mitigates a magnetic saturation, since the wide rear portion has a width wider than that of the tip portion.

26. A thin film magnetic head as claimed in claim 17, wherein the wide rear portion mitigates a magnetic saturation, since the wide rear portion has a width wider than that of the tip portion.

* * * * *